May 14, 1935.   W. T. REA ET AL   2,001,037
VOLTAGE COMPENSATION IN SIGNALING CIRCUITS
Filed Aug. 20, 1932
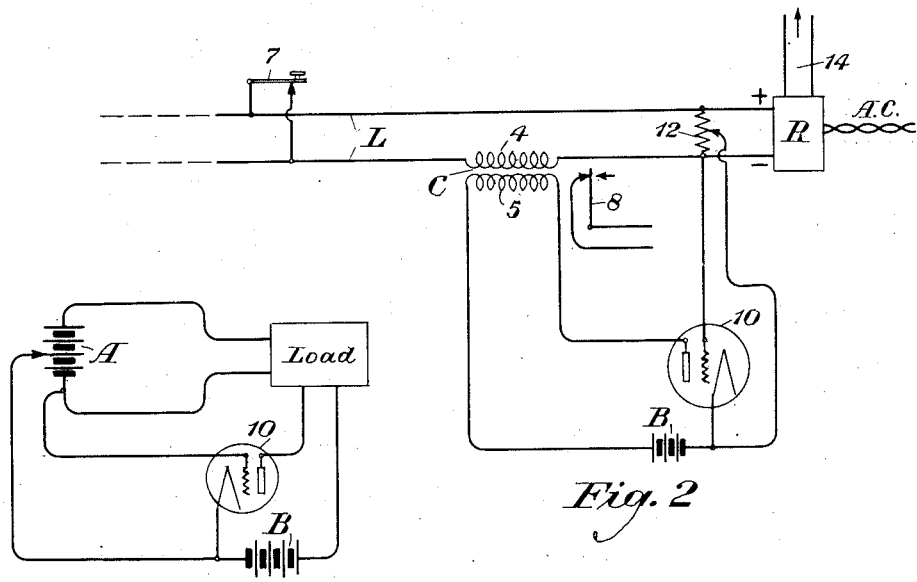
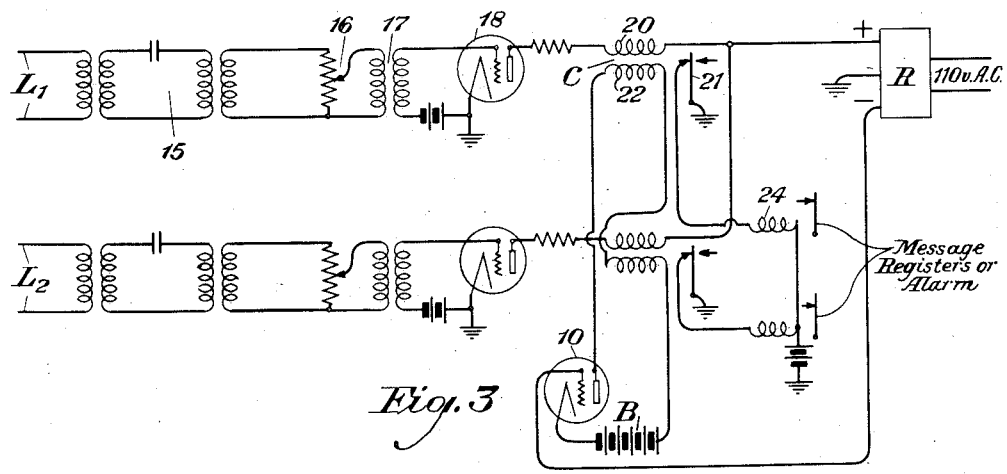
INVENTORS
W. T. Rea and
BY T. C. Henneberger
ATTORNEY Patented May 14, 1935

2,001,037

UNITED STATES PATENT OFFICE 2,001,037

VOLTAGE COMPENSATION IN SIGNALING CIRCUITS

Wilton Treat Rea, Flushing, N. Y., and Thomas Clinton Henneberger, Caldwell, N. J., assignors to American Telephone and Telegraph Company, a corporation of New York Application August 20, 1932, Serial No. 629,698

7 Claims. (Cl. 178—44)

This invention relates to compensation for voltage variations in a source of supply, and more specifically to certain types of signaling circuits comprising a source of electric power, the voltage of which is subject to large variations.

The purpose of the invention is to maintain constant or substantially constant current through a load when the voltage of the primary source varies. Another purpose is to maintain in a signaling system a substantially constant polarizing current in a magnet or in a relay as the voltage of the current source varies.

The invention will be better understood by reference to the following specification, in which Figure 1 shows a simple circuit to illustrate the principles used in our invention; Fig. 2 shows the invention applied to a simple magnet circuit; and Fig. 3 illustrates a more specific application to a certain signaling circuit.

Referring to Fig. 1, there is shown a load which is supplied from a source A. This source is shown in the illustration as a direct current battery but it may obviously be any other kind of source, such as a generator, either alternating current or direct current. In any case, such a source will be subject to certain variations and fluctuations in voltage and in some cases may actually become wholly ineffective. It may be desirable to maintain the current through the load as nearly constant as possible, either by addition of current supplied to the portion of the circuit carrying current from the primary source or by additional circuits which will supplement the first circuits in producing the desired results in the load. To this end we provide an additional independent source of electric power such as the battery B, which is normally adjusted to supply a very small amount of power to the load, this condition existing so long as the voltage of the source A remains at a value to provide the normal current. Specifically we accomplish this end by placing in series with the battery B and the load a controllable impedance such as a three-element vacuum tube. The grid circuit of this three-element tube is connected across the whole or a portion of the source A in such a way that the grid is negative with respect to the filament and preferably at such a negative value that the current from the battery B is reduced to a small or zero value. If now the voltage of the source A falls appreciably or totally, then the current from the source B is substantially increased, and by suitable choice and adjustment of elements the current flowing from the source B through the load will be sufficient to maintain the operation of the load in the manner desired. The variations of the source A may be such as to ordinarily require the introduction, by manual or automatic means, of end cells. This invention makes it possible to avoid this especially when some other supplementary source B is available.

The principle of this invention and one application thereof is shown in Fig. 2, in which the primary source consists of a rectifier R supplied from the usual alternating current power line. Such a rectifier may be used for supplying power to any load circuit, which in this figure is shown as a relay C with two windings 4 and 5. By operation of any suitable control device such as the key 7, current from the rectifier R will flow through the winding 4 in sufficient magnitude to operate the armature 8, holding it to front contact. It is apparent that signals may now be sent over the line L to control the movement of the contact element 8. In the event that the voltage from the rectifier R should drop appreciably, the current through the winding 4 might not be sufficient to hold the armature against the front contact and the operation of key 7 would therefore be ineffective. To make up for this lack of current, a supplemental source B is placed in series with the winding 5 and the plate circuit of a vacuum tube 10. The grid circuit of this vacuum tube is connected across a portion of a voltage coil 12 which is connected across the terminals of the rectifier R, and the connections are such that the grid is normally negative with respect to the filament, this voltage being adjusted to such a magnitude that the current through the plate circuit of the tube is reduced to substantially zero value. In case of appreciable drop in voltage from the rectifier, the voltage across the grid and filament is so reduced that an appreciable amount of current flows through the winding 5 and sufficient in magnitude so that when combined with the current flowing through the winding 4, the armature 8 is held to front contact. The adjustment may be such that in case the alternating current voltage for the input of the rectifier fails entirely, the current from the second source B will be sufficient to operate the armature 8. Of course, it will be evident that the relay will not be responsive to operation of the key 7, but in any case the circuits controlled by the armature 8 will remain in normal condition. The variation in voltage supplied to the winding 4 may be due to the power line fluctuations. On the other hand, it may be due to changes in a load line 14 to which the rectifier must also supply power.

Referring now to Fig. 3, there is shown a more detailed application of the invention. It is to be understood, however, that this is for illustrative purposes only and that the invention is not limited thereto but is determined by the scope of the claims hereafter. In this Fig. 3 there is shown a line L₁ over which is coming a steady alternating current. This current on passing through suitable circuits such as the tuned circuit 15, potentiometer 16, and transformer 17, is impressed upon a vacuum tube or detector 18, the plate circuit of which is supplied by the rectifier R which in turn receives its power from any suitable alternating current source. So long as the alternating current continues coming in on the line L₁, sufficient current flows through the winding 20 of the relay C to maintain the armature 21 at front contact. In case anything occurs to the line, such as a short circuit, the alternating current will fail to arrive and the armature 21 will be operated. In such operation it may control a relay 24 which in turn may register an alarm or suitable record. Such short circuiting may be due to and has been used to record the swinging together of two conductors of a transmission line, due to winds.

In the event that the voltage from the rectifier should decrease substantially or should fail entirely, the armature 21 would leave its front contact even though alternating current continued coming over the line; and the relay 24 would therefore be operated to give a false record. To prevent such false record, the second winding 22 of the relay C is supplied with current from the supplemental source B in the manner heretofore described and in such magnitude as to make up for the loss of current from the rectifier R. In general the adjustment would be such that the sum of the effects of the currents through the two windings 20 and 22 would remain substantially constant and thus false operation of the relay 24 would be prevented. It will be evident that so long as the voltage from the rectifier R has not fallen to very low values, the system will still operate to show defects in the line L₁ and make a record through relay 24. On the other hand, if the voltage of the rectifier R falls to very low values or fails entirely, then the armature 21 will be kept to its front position to prevent false records but the circuit will, of course, be ineffective to record conditions in the line L₁.

It is to be pointed out that the source B would in general be one which is used for other purposes on the signaling system where direct current is necessary and the drain on the battery B for the winding 22 would be very small since the time when it is called to supply current to that winding is occasional only.

It is also to be pointed out that this regulating circuit with the vacuum tube 10 may be used to control a plurality of circuits. Thus in Fig. 3 a second line L₂ with associated apparatus similar to that of the circuit L₁ is shown, and the relays associated with both L₁ and L₂ are controlled in the same manner.

It is evident that many variations may be made to this invention and that it will find application in many other places than those described, all without departing from the spirit of the invention.

What is claimed is:

1. In a signaling circuit, a relay, one winding of which is supplied with current from a source of desirably constant but irregular voltage, a second winding on said relay and a supplementary source of voltage continuously supplying current thereto, a vacuum tube in series with the second winding and second source of voltage, and connections from the first source to the vacuum tube whereby the current to the second winding is caused to render the relay substantially independent of said irregularities.

2. In a signaling circuit, a relay, one winding of which is supplied with current from a source of fluctuating voltage, a second winding on said relay and a supplmentary source of voltage continuously supplying current thereto, a vacuum tube in series with the second winding and second source of voltage, and connections from the first source to the grid of the vacuum tube so related as to increase the current from the vacuum tube when the voltage from the first source decreases, the two windings operating to render the relay independent of voltage fluctuations of the first-mentioned source.

3. In a signaling circuit, a transmission line, a detector at the receiving end, means for transmitting an alternating current signal thereon, a relay in the output circuit of the detector, a source of voltage subject to fluctuations for said relay, a three-element vacuum tube and a second source of voltage continuously applied to the plate circuit of said vacuum tube, a second winding of the relay connected in the plate circuit of said vacuum tube, and connections from the first source to the grid circuit of the tube to control the current in the plate circuit of the vacuum tube in accordance with variations in the voltage of the first source.

4. In a signaling circuit, a transmission line, means for transmitting a signal current thereon, a relay in the transmission line, a source of voltage subject to fluctuations for said relay, a vacuum tube device comprising a grid and a second source of voltage for the plate circuit continuously applied thereto, a second winding in the plate circuit of said vacuum tube, and connections from the first source to the grid of the tube to control the current in the plate circuit of the vacuum tube in accordance with variations in the voltage of the first source.

5. In a signaling circuit, a relay supplied with current from a source of voltage subject to undesired fluctuations, a supplementary source of voltage adapted to supply current to said relay continuously, and means for causing the current supplied to the relay by the second source to alter in a manner to produce action by the relay substantially independent of the said undesired fluctuations.

6. In a signaling circuit, a transmission line, means for transmitting a signal current thereon, a relay in the transmission line, a source of voltage subject to fluctuations for said relay, a controllable impedance and a second source of continuously applied voltage therefor, a second winding of the relay connected in series with said controllable impedance, and connections from the first source to the controllable impedance to control the current from the second source in accordance with variations in the voltage of the first source whereby the force acting on the relay is substantially independent of voltage fluctuations in the first source.

7. In a signaling circuit, a relay one winding of which is supplied with current from a source of irregular voltage, a second winding on said relay and a supplementary source of voltage continuously supplying current thereto, a vacuum tube in series with the second winding, a second source of voltage, and connections from the first source to the vacuum tube whereby the current to the second winding is caused to increase as the voltage of the first source decreases, both windings being associated to operate on the relay in the same direction.

WILTON T. REA.
THOMAS C. HENNEBERGER.